United States Patent Office 3,779,987
Patented Dec. 18, 1973

3,779,987
PROCESS FOR PRODUCING DIORGANOPOLY-
SILOXANE POLYMERS
John S. Razzano, Troy, N.Y., assignor to
General Electric Company
No Drawing. Filed Oct. 12, 1972, Ser. No. 296,797
Int. Cl. C08f 11/04
U.S. Cl. 260—46.5 R                                14 Claims

ABSTRACT OF THE DISCLOSURE

A process for producing diorganopolysiloxane polymers having a viscosity of 1000 to 200,000,000 centipoises at 25° C. and an aromatic content of 1 to 50 mole percent comprising mixing a first cyclic polysiloxane with a second cyclic polysiloxane in the presence of 1 to 90 parts based on 100 parts of said first cyclic polysiloxane of a linear diorganopolysiloxane additive having a viscosity of 10,000 to 200,000,000 centipoises at 25° C., where the organo groups in the linear diorganopolysiloxane are selected from the class consisting of alkyl, cycloalkyl, mononuclear aryl, mononuclear alaryl, mononuclear aralkyl, alkenyl, binuclear aryl and mixtures theerof wherein less than 50 mole percent of the organo radicals may be aromatic and no more than 50 mole percent of the organo radicals may be selected from alkenyl; heating the mixture to temperatures in the range of 110–175° C. to drive off moisture; adding up to 50 parts per million of an alkali metal hydroxide to the mixture; and equilibrating the resulting mixture at a temperature in the range of 140 to 200° C. until the desired reaction product is obtained.

BACKGROUND OF THE INVENTION

The present invention relates to a process for producing silicone polymers and more particularly to a process for producing linear silicone polymers having an aromatic content of anywhere from 1 to 50 mole percent.

Various processes for producing a linear diorganopolysiloxane polymer whether triorganosiloxy-stopped or silanol-stopped are known, which polymers have a certain aromatic content. These polymers are then mixed with other ingredients and are used to produce compositions which either cure at room temperature to a silicone rubber consistency or which cure at elevated temperatures to a silicone rubber consistency.

There are various reasons why it is desired to have a certain aromatic content in such silicone polymers which are either used as fluids or greases to produce room temperature vulcanizable silicone rubber compositions or heat vulcanizable silicone rubber compositions.

One of the reasons for designating an aromatic content in such polymers is that the resulting composition will have good low temperature properties, that is, that even at temperatures as low as −100° C., the resulting cured silicone rubber composition will still be rubbery and have a rubbery consistency.

Another reason for desiring a certain aromatic content in the polymers that are utilized to produce silicone rubber compositions is that the cured silicon rubber compositions will have optical clarity which is desirable in certain applications of the silicone rubber compositions.

A more important reason for desiring a certain aromatic content in linear diorganopolysiloxane polymers which are utilized to produce cured room temperature vulcanizable silicone rubber compositions or heat vulcanizable silicone rubber compositions is that the aromatic content in the polymer that is utilized to produce the silicone rubber compositions imparts desired flame retardancy to the cured silicone rubber composition.

Thus, for the above reasons as well as many other reasons, it is desired that the diorganopolysiloxane polymer have a certain aromatic content and preferably an aromatic content in the polymer of 1 to 50 mole percent.

The most direct and advantageous process particularly as applied to producing triorganosiloxy-stopped linear diorganopolysiloxanes is to produce an aromatic tetramer which may be obtained, for instance, by hydrolyzing diphenyldichlorosilane.

The complementary alkyl, alkenyl, cycloalkyl and other type of desired tetramer may be obtained by hydrolyzing such as, for instance, dimethyldichlorosilane, and then treating the hydrolyzate with hot KOH and then, with vacuum applied to the reaction vessel, strip off a mixture of the methyl cyclics.

At this point it would be desirable to mix the methyl tetramer with the aromatic or diphenyl tetramer that is a solid, drive off any moisture that is present and then add a sufficient amount of alkali metal hydroxide catalyst along with chain stopper and equilibrate the two at elevated temperatures to obtain the desired linear diorganopolysiloxane polymer of the desired viscosity. However, one difficulty in this procedure is that the diphenyl tetramer or aromatic tetramer is not very soluble in the methyl tetramer. As a result of this as well as other factors which are not fully understood, these two ingredients polymerize very slowly in the foregoing described process even at high KOH levels such as is required to produce a trimethyl siloxy-stopped methyl, phenyl polymer. The equilibrating time may be as long as 20 hours or more. It also has been found that at very high levels of alkali metal hydroxide that are needed as a catalyst, such as, 100 parts per million of KOH or more in addition to the long equilibration time that is required, it has also been found that the high KOH level causes dephenylation, thus introducing trifunctionality to the final desired linear diorganopolysiloxane product. The introduction of trifunctionality results not only in poor reproducibility from batch to batch in the final viscosity of the desired linear diorganopolysiloxane gum, but furthermore the dephenylation that occurs the more difficult the diorganopolysiloxane product is to process, particularly, in the case where it is desired to produce high viscosity linear diorganopolysiloxane gums. Also, in the case when it is desired to produce a triorganosiloxy-stopped polymer, the presence of high alkali metal hydroxide level introduces silanol chain-stopping which is undesired in such a polymer since the presence of even small amounts of silanol groups in such a polymer product will cause interaction with the filler additives and result in structuring of the resulting composition.

Thus, the above postulated foregoing process has been found unworkable in practice because of the high KOH level that is required to cause polymerization and because of the undesirable side effects of the high alkali metal hydroxide level and because of the disadvantages inherent in the polymers produced at the high alkali metal hydroxide level.

Accordingly, it has been proposed to catalyze the methyl tetramer when it is reacted with the phenyl or other type of aromatic tetramer by utilizing less than 50 parts per million of alkali metal hydroxide. However, the polymerization cannot be carried out when pure methyl tetramer and aromatic tetramer are added together. However, one way of carrying the process out with the low levels of alkali metal hydroxide catalysts is to take methyl tetramer and add to it the desired low level of alkali metal hydroxide and then heat the resulting mixture above 100° C. for a sufficient amount of time so as to prepolymerize the methyl tetramer to the desired level. At that time, there is added to the partially polymerized methyl tetramer the desired level of aromatic tetramer. However, one difficulty with this process is that there is no way to remove moisture from the two reactants, that is, the partially polymerized methyl tetramer and the phenyl tetramer prior to the mixture of one with the other and the polymerization of both at low alkali metal hydroxide levels. It should be noted, of course, that the diphenyl or aromatic tetramers since they are solids have a certain amount of absorbed water in them which is introduced into the reaction mixture ingredients and there is no convenient way of removing the moisture from the solid aromatic tetramer prior to its incorporation into the partially polymerized methyl tetramer. There is also no convenient or practical method of removing the moisture from the mixture of the partially polymerized methyl tetramer and solid aromatic tetramer mixture once they are mixed together. Accordingly, a portion of the desired reaction product of the linear diorganopolysiloxane product will not be triorgano siloxy-stopped but will be stopped with silanol groups which introduces poor viscosity control in the final desired product, that is, poor viscosity control in the production of the desired reaction product from batch to batch. The moisture cannot be removed from the mixture of the partially polymerized methyl tetramer and solid aromatic tetramer since there are alkali metal hyroxide catalysts in the mixture which will result or cause the moisture to polymerize into the reactants as silanol groups, thus, producing a certain amount of linear diorganopolysiloxane with the silanol groups therein. Accordingly, it would be highly desirable to simply mix a methyl or other alkyl, cycloalkyl, alkylalkenyl tetramer. trimer or pentamer or mixture of these compositions together with an aromatic tetramer and drive off all of the moisture and then at that time add the desired amount of low level alkali metal hydroxide catalyst whereupon the mixture can then be heated at elevated temperatures to produce the desired linear diorganopolysiloxane gum which is triorgano siloxy-stopped. This would result in a product having the desired linearity with very little or no silanol content and by which process there can be obtained good viscosity control of the desired product in the production of the desired product from batch to batch.

The only way by prior art processes that this could be done was to utilize high levels of alkali metal hydroxide catalysts and this is undesirable for the reasons stated previously.

In addition, even in the case of the production of silanol-stopped diorganopolysiloxanes where the presence or absence of water is not a factor, it is desirable to have a convenient process for producing such silanol-stopped diorganopolysiloxanes where the final viscosity of the desired silanol-stopped diorganopolysiloxane can be closely controlled from batch to batch. In accordance with the above comments, this can only be done if the desired tetramers are mixed together and then all of the water is driven off from the mixture. Then the desired amount of water is added sometime during polymerization so as to obtain the desired product of the desired viscosity.

Accordingly, it is one object of the present invention to provide for an efficient and convenient process for producing linear triorgano siloxy-stopped diorganopolysiloxane polymers having an aromatic content therein.

It is another object of the present invention to provide for an efficient and convenient process for producing silanol-stopped diorganopolysiloxane polymers whose final viscosity can be controlled from batch to batch and whose final characteristics can be controlled from batch to batch.

It is still another object of the present invention to provide for a process for producing triorgano siloxy-stopped diorganopolysiloxane polymers wherein most of the water can be removed from the tetramers prior to the equilibration part of the process.

It is yet another object of the present invention to provide for a process for producing a triorgano siloxy-stopped diorganopolysiloxane where substantially all of the water can be removed from the tetramer, trimer or pentamer reaction ingredients prior to the addition of a low alkali metal hydroxide catalyst level and the equilibrating step in the process whereby the final desired viscosity diorganopolysiloxane polymer is obtained.

These and other objects of the present invention are accomplished by means of the invention defined below.

SUMMARY OF THE INVENTION

In accordance with the above objects, there is provided by the present invention (a) a process for producing diorganopolysiloxane polymers having a viscosity of 1,000 to 200,000,000 centipoise at 25° C., and an aromatic content of 1 to 50 mole percent comprising mixing the first cyclic polysiloxane of the formula, (1)                      $(R_2SiO)_n$ 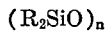

with a second cyclic polysiloxane of the formula, (2)                      $(R'_2SiO)_n$ 

in the presence of 1 to 90 parts based on 100 parts of said first cyclic polysiloxane of a linear diorganopolysiloxane additive having a viscosity of 10,000 to 200,000,000 centipoise at 25° C., where the organo groups in the diorganopolysiloxane are selected from the class consisting of alkaryl, cycloalkyl, mononuclear aryl, mononuclear alkaryl, mononuclear aralkyl, alkenyl, binuclear aryl, and mixtures thereof, wherein up to 50 mole percent of the organo radicals may be aromatic and up to 50 mole percent of the organo radicals may be selected from alkenyl; (b) heating the mixture to temperatures in the range of 110–175° C. to drive off moisture; (c) adding up to 50 parts per million of an alkali metal hydroxide catalyst to the mixture; (d) equilibrating the resulting mixture at temperatures in the range of 140 to 200° C. until the reaction product is obtained, where R is selected from the class consisting of alkyl, cycloalkyl, alkenyl and mixtures thereof of 1 to 8 carbon atoms where there may be present in such R radicals no more than 15 mole or preferably 10 mole percent alkenyl and $R^1$ is selected from the class consisting of mononuclear aryl, mononuclear alkaryl, mononuclear aralkyl and alkenyl of 2 to 15 carbon atoms and $n$ is a whole number that varies from 3 to 5.

In the most preferred embodiment of the present invention, $n$ is equal to 4, that is, there are two tetramers reacted. However, the present process can also be carried out when either $n$ is 3 or 5 and where $n$ in the same compound comprises compositions where there is present compounds where $n$ is 3, 4 and 5, in one or both cyclic polysiloxanes.

The alkali metal hydroxide catalyst of step (b) may be selected from the class consisting of potassium hydroxide, cesium hydroxide and rubidium hydroxide.

In the above foregoing process it is preferred that the equilibrating be carried out until there is present from 15 to 50% by weight of volatiles in the reaction mixture, so as to obtain the desired reaction product. More preferably, the equilibration is carried out until there is 10 to 25% by weight of volatiles which comprises mostly the cyclic siloxanes.

In a more definitive explanation of the process, the equilibrating step can be carried out anywhere from 3 to 12 hours with a more preferably reaction time of 3 to 6 hours, wherein the desired amount of volatiles are obtained. When the moisture is driven off in the foregoing process, it is preferred that sufficient moisture be driven off during such step in the process such that there is 50 parts per million of water or less in the mixture.

As an additional step in the process, it is necessary that after the equilibrating step is carried out and the desired amount of volatiles is obtained or the desired diorganopolysiloxane reaction product is obtained that there be added a neutralizing agent to the mixture. After the neutralizing agent is added so as to neutralize the catalyst the volatiles may be then driven off by distillation procedures so as to leave in the reaction kettles substantially the linear diorganopolysiloxane reaction product of the desired viscosity.

The preferred neutralizing agents are toluene sulfonic acid, phosphoric acid, acetic acid and allyl bromide. In various aspects of the present process, there is preferably added to the reaction mixture ingredients prior to the addition of the alkali metal catalyst, a sufficient or desired amount of chain-stopper to obtain a linear diorganopolysiloxane reaction product that is to be formed. Such a chain-stopper should have a viscosity of up to 10,000 centipoise at 25° C. and may be selected from the class consisting of water, organodisiloxanes, organo end-stopped polysiloxanes and silanol-stopped disiloxanes and silanol-stopped polysiloxanes. It can be appreciated that the water and silanol-stopped materials would be utilized when it is desired to produce a silanol-stopped diorganopolysiloxane reaction product polymer whereas the organo end-stopped polysiloxanes or disiloxanes would be utilized when it is desired to obtain a triorganosiloxy end-stopped reaction product which is utilized in heat vulcanizable silicone rubber compositions. Such chain-stopper may be utilized anywhere from a concentration of 100 parts per million up to 30% by weight of the reaction mixture ingredients. It should be pointed out here that the dividing line between the utilization of a material as an additive or as a chain-stopper in the present process is the 10,000 centipoise level, that is, the additive as utilized in the process of the present invention may not have a viscosity that is less than 10,000 centipoise, otherwise, it cannot operate in the present process. On the other hand, the chain-stopper must have a viscosity of less than 10,000 centipoise. It should be pointed out that in the present polymerization process, additives that have a viscosity less than 10,000 centipoise and more particularly below 5,000 centipoise will not function efficiently in the present process for promoting polymerization between the various cyclic polysiloxanes. It should also be appreciated by a worker skilled in the art that most chain-stoppers have a viscosity of considerably below 5,000 centipoise at 25° C. Thus, in terms of the understanding of the present process when a chain-stopper has a viscosity of 10,000 centipoise or more and it is utilized in the concentration ranges indicated above, then it will be functioning both as a chain-stopper and as a polymerization additive in accordance with the present process. However, any linear diorganopolysiloxane material that is added and that has a viscosity of less than 10,000 centipoise can only function as a chain-stopper and must be used in the amounts desired to produce proper chain-stopping of the linear diorganopolysiloxane that is formed to obtain the desired results.

DESCRIPTION OF THE PREFERRED EMBODIMENT

The radical R may represent any monovalent hydrocarbon radical, e.g., alkyl radicals, such as methyl, ethyl, isopropyl, tertiary butyl, hexyl, octyl, decyl, myristyl; cyclo aliphatic radicals, such as cyclopentyl, cyclobutyl, cyclohexyl and alkenyl radicals, such as vinyl, allyl, methyl allyl, and butadienyl. It is understood that in Formula 1, that the R radical may be any particular radical or a mixture of various types of radicals of the various types of generic groups indicated above. In general, it is preferred that no more than 15 mole percent of the R radicals be alkenyl and preferably no more than 10 mole percent of the R radicals be alkenyl.

The R' radical in Formula 2, is selected from aromatic radicals and unsaturated hydrocarbon radicals. More preferably, the R' radical is selected from the class of mononuclear aryl, such as phenyl, mononuclear alkaryl, such as benzyl and xylyl and mononuclear aralkyl radicals such as, benzyl and ethylphenyl as well as other aromatic hydrocarbon radicals. In addition, the R' radical may be a binuclear aryl radical such as naphthyl. In one preferred embodiment, the R' radical is a phenyl radical of phenyl derivative. In a more preferred embodiment, at least 50 mole percent of the R' radicals in Formula 2 are aromatic radicals. Most preferably, 90 to 100 mole percent of the R' radicals are aromatic radicals, such as phenyl and phenyl derivatives. In addition, the R' radical may be selected from alkenyl radicals such as vinyl, allyl, methylallyl, hexenyl and butadienyl. Preferably, no more than 50 mole percent of the R' radicals are selected from alkenyl radicals, such as vinyl, allyl, etc.

The organo groups of the linear diorganopolysiloxane additive are selected from the class consisting of alkyl, cycloalkyl, mononuclear aryl, mononuclear alkaryl, mononuclear aralkyl, alkenyl and binuclear aryl and mixtures of the above radicals. Preferably, up to 50 mole percent of the organo groups are selected from aromatic radicals and most preferably from mononuclear aryl radicals and derivatives of mononuclear aryl radicals. Up to 10 or 50 mole percent of the organo radicals may also be selected from alkenyl radicals such as, vinyl, allyl, etc. The number of carbon atoms in the organo groups in the linear diorganopolysiloxane additive may vary and are preferably from 1 to 15 carbon atoms. In the more preferred embodiment, the R radicals are lower hydrocarbon radicals of 1 to 8 carbon atoms. In the same vein, in the more preferred embodiment the R' radicals are lower hydrocarbon radicals of 2 to 15 carbon atoms.

Generally, the linear diorganopolysiloxane additive is utilized at a concentration of 1 to 90 parts based on 100 parts of said first cyclic polysiloxane of Formula 1. In the more preferred embodiment, the linear diorganopolysiloxane additive may be utilized and is preferably utilized at a concentration of 2 to 15 parts based on 100 parts of the first cyclic polysiloxane of Formula 1.

It must be understood that although the linear diorganopolysiloxane additive may be utilized at concentrations higher than 90 parts by weight based on 100 parts of said first cyclic polysiloxane of Formula 1, no advantage is gained thereby. This is especially true since at this high concentration the linear diorganopolysiloxane additive also functions as a chain-stopper thus limiting the final viscosity of the desired diorganopolysiloxane reaction product. It should also be noted that the viscosity of the linear diorganopolysiloxane additive is important and should vary from 10,000 to 200,000,000 centipoise at 25° C., and more preferably varies from a viscosity of 20,000 to 50,000,000 centipoise at 25° C.

It is the object to produce in accordance with the present invention, either alkenyl-containing linear diorganopolysiloxane polymers, alkenyl and aromatic-containing linear diorganopolysiloxane polymers or aromatic-containing linear diorganopolysiloxane polymers, wherein the viscosity of these linear diorganopolysiloxane polymers may vary from a low viscosity of 1000 centipoise to up to 200,000,000 centipoise at 25° C. The present process can be utilized to produce diorganopolysiloxane reaction products of a viscosity of about 1,000,000 to 200,000,000 centipoise at 25° C. when the linear diorganopolysiloxane reaction product is to be utilized for the production of heat vulcanizable silicone rubber compositions. On the other hand, the present process can be utilized to produce linear diorganopolysiloxane reaction products of a viscosity of 1,000 to 2,000,000 centipoise at 25° C., when such diorganopolysiloxanes are to be used in room temperature vulcanizable silicone rubber compositions or as oils in various silicone fluid applications.

The present process is preferably directed to producing aromatic-containing diorganopolysiloxane polymers which can be either silanol-stopped or triorganosiloxy-stopped but more preferably triorgano siloxy-stopped for heat vulcanizable room temperature applications. In addition, the present process may be utilized to produce linear diorganopolysiloxane polymers within the above viscosity limitations shown above which contain alkenyl groups anywhere from a low limit of up to 10 mole percent or 15 mole percent of alkenyl groups of up to 50 mole percent of alkenyl substituent groups. As can be visualized the present process may be also utilized to produce linear diorganopolysiloxane polymers within the viscosity ranges indicated above which contain both aromatic groups and alkenyl groups in the polymer. As is, of course, obvious from the prior presentation, the linear diorganopolysiloxane reaction product in all cases contains alkyl or cycloaliphatic radicals thereon.

The process of the present invention is most suitable for producing linear diorganopolysiloxane reaction polymers which have an aromatic content and may or may not contain in their up to 50 mole percent of alkenyl substituent groups. Generally, the linear diorganopolysiloxane reaction product may contain up to 50 mole percent of aromatic radicals and more preferably phenyl or phenyl derivative radicals. Preferably, and for many applications, the reaction product polymer of the present process contains from 1 to 20 mole percent of aromatic radicals and more particularly phenyl or phenyl derivative radicals with up to 50 or more mole percent of alkenyl radicals and more particularly vinyl radicals. Such a reaction product is obtained by producing first a first cyclic polysiloxane of Formula 1 above and a second cyclic polysiloxane of Formula 2 above. The cyclic polysiloxane of Formula 1 above is obtained by passing $R_2SiCl_2$ into hot potassium hydroxide which is maintained at a temperature of 110 to 150° C. and then vacuum stripping from the reaction mixture the cyclic polysiloxane of Formula 1 above. In the above formula, that is $R_2SiCl_2$, the R group is as defined previously for Formula 1.

The cyclic polysiloxane of Formula 2 above is obtained by taking a compound of the formula

where R' is as defined previously and dissolving it in toluene and then adding to the toluene solution 20 to 80 parts of an alkali metal hydroxide while maintaining the solution at a temperature of 50 to 100° C. After a period of 1 to 5 hours, the solution is cooled whereby there precipitates out the cyclic polysiloxane of Formula 2 above. The above procedure for producing the cyclic polysiloxane of Formula 2 above is especially suitable when the cyclic polysiloxane of Formula 2 has a high aromatic content. When it has a low aromatic content such that when most of the R' groups are alkenyl then the resulting cyclic polysiloxane is obtained in a pure form by distilling it off from the reaction mixture. Of course, as is known there are other methods for producing the cyclic polysiloxanes of Formula 1 and Formula 2 in pure form and such processes as well as the processes set forth above are well known in the art and form no part of the present disclosure.

It must be emphasized that the present process is particularly suited and directed to the production of aromatic-containing and particularly phenyl and phenyl derivative-containing linear diorganopolysiloxane polymers within the viscosity range indicated in the previous discussion. Nevertheless, in carrying out the process of the present invention, the cyclic siloxane of Fomula 1 is taken and mixed with a cyclic polysiloxane of Formula 2 above in a reaction kettle. There is then added to these ingredients the linear diorganopolysiloxane additive disclosed above. The amount of the cyclic siloxane of Formula 1 that is used relative to the amount of the cyclic polysiloxane of Formula 2, depends on the compositions of the various cyclic polysiloxanes and the desired composition of the final linear diorganopolysiloxane product. In this respect, it should be remembered that it is desirable that the linear diorganopolysiloxane additive have a composition that is as close to the composition of the desired reaction product of the present process. This similarity in compositions is not necessary but is desirable. This similarity is especially desirable if the linear diorganopolysiloxane additive is to function both as an additive in accordance with the disclosures of the present process and also as a chain-stopper in the process. Thus, if it is desired that the final linear diorganopolysiloxane product be vinyldimethyl siloxy-stopped it is desirable that the additive also be vinyldimenthyl siloxy-stopped.

It should be pointed out that it is a necessary condition whether or not the additive functions as a chain-stopper in the present process and whether or not there is added an additional chain-stopper in the process that the additive be chain-stopped with the groups that it is desired that the final reaction product polymer of the present process be chain-stopped.

There are four considerations that are taken into account in choosing the particular additive, that is, (1) its solubility in connection with the particular cyclic polysiloxane; (2) its viscosity in terms of the final viscosity of the reaction product polymer that is desired; (3) its linearity and; (4) also that it is chain-stopped properly.

With respect to its linearity it must be pointed out that the additive should be substantially linear and by substantially linear it is meant that it should generally have less than 500 parts per million and preferably less than 300 parts per million of trifunctional siloxy impurities in it. If it has more than this amount of trifunctional siloxy impurities in it, especially if it is also to be used as a chain-stopper in the present process, then the desired linear diorganopolysiloxane reaction product will not be obtained. Thus, when the additive has a high amount of trifunctional siloxy impurities in it, it is desirable to keep the amount of the additive that is utilized in the present process to as low a level as possible since one of the objects in using cyclic polysiloxanes in the present process is to produce a substantially linear diorganopolysiloxane polymer reaction product.

With respect to the viscosity of the additive, that is, the viscosity of the additive that is used in the process within the scope of the present invention, it is desirable that the additive have a viscosity in the area of the desired viscosity of the final substantially linear diorganopolysiloxane reaction product.

With respect to solubility, it is important that in the linear disorganopolysiloxane additive that the substituent groups of the additive be able to dissolve and intersperse with the substituent groups of the cyclic polysiloxanes, if the proper contact is to be obtained between the additive and the cyclic polysiloxanes so as to obtain the desired reaction rate and reaction product.

The amount of one cyclic polysiloxane, that is, the cyclic polysiloxane of Formula 2, that is utilized with reespect to the amount of cyclic polysiloxane of Formula 1 in the process of the present invention can vary depending on the substituent groups and concentration of such substituent groups and the cyclic polysiloxanes used in the process and the final desired concentration of said substituent groups in the final linear diorganopolysiloxane reaction product. Thus, based on 100 parts of the cyclic polysiloxane of Formula 1, there may be utilized anywhere from 1 to 100 parts or more of the cyclic polysiloxane of Formula 2 depending on the composition that is desired and the concentration of the substituent groups that is desired in the final reaction produce. In addition to the cyclic polysiloxane of Formulas 1 and 2 indicated above and the linear diorganopolysiloxane additive, there is preferably utilized in the process of the present invention a certain amount of chain-stopper. Such a chain-stopper must have a viscosity of less than 10,000 centipoise, otherwise, it is simply an additive in accordance with the process of the present invention. Such a chain-stopper may be an organodisiloxane or an organo end-stopped polysiloxane such as, hexamethyldisiloxane, trimethylsiloxy end-stopped dimethylpolysiloxane and etc., or chain-stoppers such as divinyltetramethyldisiloxane, wherein the foregoing chain-stoppers do not contain any silanol groups and are thus utilized in the production of linear diorganopolysiloxane reaction products of the present case which are triorganosiloxy end-stopped. In the case where the desired reaction product is to be silanol chain-stopped then the chain-stopper may be water, silanol-stopped disiloxanes and silanol-stopped polysiloxanes of a viscosity of less than 10,000 centipoise at 25° C. If the viscosity of the chain-stopper is above 10,000 centipoise and it meets the other conditions as set forth previously, then it functions as an additive within the scope of the present invention. It must be emphasized that most chain-stoppers used in the present process to produce linear diorganopolysiloxane polymers of a viscosity higher than 1 to 2,000,000 centipoise are ones with from 2 to 20 siloxane groups in the polymer molecule and such siloxanes have a viscosity of less than 1000 centipoise and thus will not function at any concentration as an additive in the present invention. In fact, it can be appreciated that all chain-stoppers have a viscosity of less than 10,000 centipoise at 25° C. and thus cannot function as an additive in the process of the present invention. On the other hand, if the additive of the present invention is utilized at a high enough concentration it may function both as an additive to promote the polymerization of the cyclic polysiloxane and also as a chain-stopper. The amount of chain-stopper that is utilized and is mixed with the other ingredients of the process of the present invention depends on the amount of additive that is utilized. However, generally, there is utilized from 100 parts per million to 30% by weight of the reaction ingredients of such chain-stopper and more preferably 200 parts per million to 1% by weight of the reaction ingredients, which reaction ingredients include the additive.

Thus, the cyclic polysiloxanes in the desired concentrations are placed in the kettle and then there is added to them the additive of the present case as defined above and also the chain-stopper in the concentration desired. At that point, the reaction ingredients are heated at anywhere from a temperature of 110 to 175° C. and more, preferably 150 to 175° C. to distill off an azeotrope of the cyclic polysiloxane of Formula 1 and water so as to remove as much of the moisture from the reaction ingredients and preferably to remove sufficient moisture from the reaction ingredients until there is less than 50 parts per million of moisture in the reaction ingredients. This azeotroping procedure to remove moisture is preferably carried out over a period of 1 to 5 hours. At the end of the time, thre is then added anhydrously to the reaction mixture less than 50 parts per million of an alkali metal hydroxide. Any alkali metal hydroxide such as potassium hydroxide, cesium hydroxide and rubidium hydroxide may be utilized in the process of the present invention as a catalyst. Preferably, potassium hydroxide is utilized.

Then, the reaction ingredients are equilibrated at a temperature in the range of 140 to 200° C. for 3 to 12 hours and more preferably 3 to 6 hours. The reaction may be stopped at any point at which a reaction product for the desired viscosity is obtained. Thus, generally, the equilibration reaction is usually terminated at any point at which there are from 10 to 25% by weight of volatiles in the reaction mixture. Most preferably, the reaction is terminated when there are 10 to 15% volatiles in the reaction mixture since at that point the largest amount of linear diorganopolysiloxane reaction product that can be obtained from the cyclic siloxanes has been produced.

The viscosity of the final end product is dependent on the amount of chain-stopper that is utilized. It is not dependent on the amount of additive that has been utilized unless large amounts of the additives are used in the process, say, above 20 parts by weight of additive per 100 parts of the cyclic polysiloxane of Formula 1, and in the case where no chain-stopper is utilized with the reaction ingredients. In the situation where lower amounts of the additive are utilized as part of the reaction ingredients of the process of the present invention, then the final viscosity of the reaction product is controlled by the amount of chain-stopper that is added to the reaction ingredients.

After the desired amount of volatiles are present in the reaction mixture, the kettle is cooled and there is added to the reaction ingredients a sufficient amount of a neutralizing agent so as to neutralize the alkali metal hydroxide catalyst that was added to the ingredients. Such a neutralizing agent may be any neutralizing agent but it is preferably selected from toluene sulfonic acid, phosphoric acid, allyl bromide and acetic acid. Any of these acids may be added in sufficient amount to neutralize the alkali metal hydroxide catalyst that is present in the reaction mixture and the acid is stirred thoroughly into the reaction mixture so as to mix and then neutralize the alkali metal hydroxide catalyst. Then at that point, the reaction vessel is heated at temperatures above 100° C. and preferably above 150° C. so as to remove all volatiles from the reaction mixture thus leaving behind the desired linear diorganopolysiloxane reaction product. The reaction product is one with a viscosity in the range of 1000 to 200,000,000 centipoise at 25° C., which is a substantial linear diorganopolysiloxane of the desired substituent groups and particularly of the desired alkyl, cycloalkyl and aromatic as well as optionally an alkenyl content. It may also be silanol-stopped or triorganosiloxy-stopped depending on the chain-stopper and additive used in the process. Of course, the final viscosity and the desired viscosity of the reaction product that is obtained will be within the range desired depending on the amount of additive that was used and depending on the amount of chain-stopper that was used.

In accordance with the present process, there is obtained a substantially linear diorganopolysiloxane reaction product and by substantially linear it is meant a linear diorganopolysiloxane reaction product with less than 100 parts per million of trifunctional siloxy groups therein and which has a viscosity of anywhere from 1000 to 200,000,000 centiposise at 25° C. and contains methyl, phenyl and vinyl substituent groups. Thus, in the most preferred embodiment the R radical in the cyclic polysiloxane of Formula 1 above is methyl and the R' radical in the cyclic polysiloxane of Formula 2 above is selected from phenyl and vinyl. In such case, of course, it is preferred that the additive be composed of the proper proportion of methyl, phenyl and vinyl groups.

The substantial linear diorganopolysiloxane additive when used to produce a silanol-stopped diorgano polysiloxane reaction product has preferably the formula,

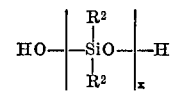

where $R^2$ has the definition of the organo groups for the linear diorganopolysiloxane additive as set forth above and $x$ varies from 500 to 15,000.

In the case where there is to be produced by the process of the present invention and which is the most preferred process of the present invention, a substantially linear diorganopolysiloxane reaction product which is triorgano siloxy-stopped then the linear diorganopolysiloxane additive has preferably the formula,

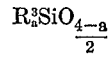

where $R^3$ is defined the same as the organo groups in the linear diorganopolysiloxane additive as defined above and $a$ varies from 1.95 to 2.01.

Thus, the $R^2$ and $R^3$ radicals are selected from the class consisting of alkyl, cycloalkyl, mononuclear aryl, mononuclear alkaryl, mononuclear aralkyl, alkenyl, binuclear aryl and mixtures thereof wherein up to 50 mole percent of the $R^2$ and $R^3$ radicals may be aromatic and no more than 50 mole percent of the $R^2$ or $R^3$ radicals are selected from alkenyl in the formulas set forth above In the case where the linear diorganopolysiloxane reaction product produced in accordance with the process is silanol-stopped it may be mixed with a cross-linking agent such as methyltriacetoxy silane and an appropriate catalyst. When such a composition is exposed to moisture it readily cures to a hard rubbery solid. Examples of the use of such silanol-stopped linear diorganopolysiloxane reaction product as that produced by the present process in room temperature vulcanizable silicone compositions is to be found, for instance, in the patent applications of Warren R. Lampe, Ser. No. 76,265 filed Sept. 28, 1970 now U.S. pat. 3,696,090, issued Oct. 3, 1972 and Harvey P. Shaw, Ser. No. 76,266, filed Sept. 28, 1970 now U.S. Pat. 3,701,753, issued Oct. 31, 1972.

When the linear diorganopolysiloxane reaction product of the present case is triorgano siloxy-stopped and generally has a viscosity of anywhere from 1,000,000 to 200,000,000 centipoise at 25° C. and more preferably 2,000,000 to 50,000,000 centipoise at 25° C., then it is eminently suitable as the basic ingredient for heat vulcanizable silicone rubber compositions. Such compositions generally comprise the triorganosiloxy end-stopped linear diorganopolysiloxane reaction product of the present case, a process aid, a filler, optionally heat stabilizing additives, flame retardant additives and other additives which are all mixed into the reaction product of the present case. The resulting mixture may then be taken and there may be mixed into it a catalyst whereupon the composition is heated at elevated temperatures, that is, above 150° C., to cure the composition to a hard vulcanized silicone rubber mass.

In producing the silicone rubber composition there is utilized any of the filler materials of the highly reinforcing types consisting of inorganic compounds or any suitable combination of such filler materials employed in the production of elastomers as is customary in the prior art. There is preferably employed finely divided silica base fillers of the highly reinforcing type which are characterized by a particle diameter of less than 500 millimicrons and by surface areas of greater than 50 square meters per gram. Inorganic filler materials of a composition other than those preferred can be employed alone or in combination with the preferred fillers with good results. Such filler materials as titanium, iron oxide, aluminum oxide, as well as the inorganic fillers materials known as inert fillers which can include among others, diatomaceous earth, calcium carbonate and quartz can preferably be employed in combination with highly-reinforcing silica fillers to improve the tensile strength or the hardness of the elastomeric product. Other examples of suitable fillers are diatomaceous silica, aluminum silicate, zinc oxide, zirconium silicate, barium sulfate, zinc sulfide, aluminum silicate and finely divided silica having surfacebonded alkoxy groups.

There is preferably employed in heat vulcanizable silicone rubber compositions 10–200 percent by weight of said polysiloxane reaction product of the inorganic filler and preferably 20 to 60 percent by weight.

There is also employed in heat cured silicone rubber 1 to 25 percent and preferably 5 to 50 percent by weight based on the polydiorganosiloxane reaction product of a process aid for preventing the gum and the filler mixture from structuring prior to curing and after compounding. One example of such a process aid is a compound of the formula, (3) 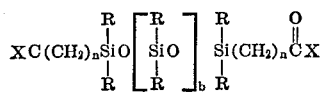

where R is a member selected from the class consisting of methyl and phenyl, X is a member selected from the class consisting of —OH, —NH$_2$ or —OR', where R' is methyl or ethyl, $n$ has a value of from 2 to 4, inclusive, and $b$ is a whole number equal to from 0 to 10, inclusive. Further details as to the properties, as well as the method of preparation of the compound of Formula 3, are to be found in the disclosure of Martellock, U.S. Pat. 3,464,945 which is herein incorporated by reference.

The process aid may also be a dihydrocarbon-substituted polysiloxane oil having a hydrocarbon substituent to silicon atom ratio of from 1.6 to 2.0 and whose hydrocarbon substituents comprise at least one member selected from the class consisting of methyl, ethyl, vinyl, allyl, cyclohexenyl and phenyl groups, said polysiloxane oil comprising polysiloxane molecules containing an average of from one to two lower alkoxy groups bonded to each of the terminal silicon atoms where the alkoxy groups are selected from the class consisting of methoxy, ethoxy, propoxy and butoxy.

Preparation of the alkoxy-containing hydrocarbon-substituted polysiloxane oils that can be employed as a process aid in the present invention can be carried out by producing one or more types of cyclic dihydrocarbon-substituted polysiloxanes from one or more types of dihydrocarbon-substituted dichlorosilanes and dialkoxysilanes in accordance with the known hydrolysis, depolymerization and fractional distillation procedures. Then one or more types of cyclic siloxanes so produced are mixed with predetermined amounts of a dihydrocarbon-substituted dialkoxysilane and the mixture is subjected to an equilibration treatment under controlled conditions to produce the desired alkoxy end-blocked hydrocarbon-substituted linear polysiloxane oil.

The alkoxy-containing hydrocarbon-substituted polysiloxane oils suitable for use in the present invention are relatively low molecular weight polysiloxane oils whose polymer chains have at least four and as much as thirty-five and more dihydrocarbon siloxy units per molecule. The polysiloxane oils preferably have an average of at least one and not more than two alkoxy groups bonded to each of the terminal silicon atoms of the molecule. A more detailed disclosure of the alkoxy end-blocked polysiloxane process aids, as well as their method of preparation, is to be found in the disclosure of Fekete, U.S. Pat. 2,954,357 which is hereby incorporated into this specification by reference.

There may also be used as a process aid hydroxylated organosilanes which contain from one silicon-bonded hydroxyl per 70 silicon atoms to two silicon-bonded hydroxyl per 70 silicon atoms to two silicon-bonded hydroxyls per silicon atom and contains from 1.9 to 2.1 hydrocarbon radicals per silicon atom. The remaining valences of the silicon atom are satisfied by oxygen atoms. The hydroxylated materials include both monomers such as diphenylsilanediol and polymeric materials which contain two silicon-bonded OH groups in the molecule. In addition, the hydroxylated organosilane may be a mixture of hydroxyl-containing siloxanes and completely condensed siloxanes. Irrespective of the particular composition of the hydroxylated organosiloxane, it is necessary that there be present in said organosiloxane from one OH to 70 silicon atoms to two OH per silicon atom.

The hydroxylated siloxanes may be prepared by any suitable method, such as heating said siloxanes with steam under pressure at temperatures of about 120° C. or hydrolyzing silanes of the formula

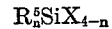

where X is any hydrolyzable group such as Cl, OR, H, —OOR or $R^5$ is a monovalent hydrocarbon radical. The former method is preferred for the preparation of those hydroxylated materials in which the hydrocarbon radicals are alkyl, while the latter method is best for the siloxanes in which hydrocarbon radicals are monocyclicaryl hydrocarbon radicals. Further, detailed information as to the hydroxylated organosiloxanes which may be used as process aids is to be found in Konkle et al. U.S. Pat. 2,890,188, the disclosure of which is being incorporated into this application by reference.

Any of the above process aids may be used alone or mixtures thereof may be used in the above-defined concentrations. Further, other suitable process aids may also be used in the silicone rubber compositions of the present invention.

The curing of the heat cured silicone rubber composition can be effected by chemical vulcanizing agents or by high energy electron radiation. More often, chemical vulcanizing agents are employed for the curing operation and any of the conventional curing agents can be employed. The preferred curing agents are organic peroxides conventionally used to cure silicone elastomers. Especially suitable are the dimethyl peroxides which may have the structural formulas,

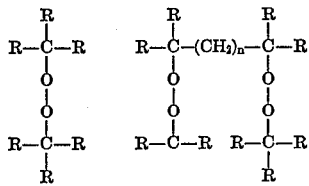

wherein R represents the same alkyl group throughout or alkyl groups of two or more different types and $n$ is zero or a larger integer.

Among the specific peroxide curing catalysts that are preferred are di-tertiary-butyl peroxide, tertiary-butyl-triethylmethyl peroxide, tertiary-butyl-tertiary-butyl-tetiary-triphenyl peroxide and dialkyl aryl peroxide such as dicumyl peroxide. Other suitable peroxide catalysts which effect curing through saturated as well as unsaturated hydrocarbon groups on the silicon chain are aryl peroxides which include benzoyl peroxides, mixed alkyl aryl peroxides which include tertiary-butyl perbenzoate, chloroalkyl peroxides such as 1,4-dichlorobenzoyl peroxide; 2,4-dichlorobenzoyl peroxide, monochlorobenzoyl peroxide, benzoyl peroxide, etc. Generally, 0.1-10 percent of said peroxide by weight of the polydiorganosiloxane reaction product is used to cure the silicone rubber composition and preferably 0.5-3.0 percent by weight.

While the silicone rubber compositions of the present invention can be produced by a number of methods, it is preferred that the process aid component be incorporated into the composition at a time no later than the incorporation of the structure-inducing filler into the silicon composition. Thus, it is possible that the polydiorganosiloxane reaction product be mixed with the process aid and then the desired amount of the structure-inducing silica filler is thereafter added. The mixing is preferably carried out on differential milling rolls or in a dough-mixer. Alternatively, the mixing operation can be carried out by mixing polydiorganosiloxane reaction product, the process aid and the silica filler together at the same time in a differential mill or doughmixer. After the mixing is completed, the silicone rubber composition free of the curing agent is precured or heated to an elevated temperature of 170°–360° C. for two hours or more to devolatilize and purge the composition. Further, this type of process aging provides opportunities for better wetting of the fillers by the gums. In addition, the precure heat aging treatment provides the further advantage of effective elimination of objectionable volatile materials such as water and absorbed gases carried into the compounds by the fillers. The curing agent is then mixed into the precured treated silicone rubber composition and then the composition is ready to be stored and cured whenever it is deemed desirable.

The amount of highly reinforced silica employed with the silicone reaction product to produce silicone compounds and silicone elastomers depends upon the tensile strength as well as on the hardness properties desired in the elastomer. Where high tensile strength and high hardness values are required, the filler employed will comprise for the most part a highly-reinforcing silica and can contain small amounts of other types of filler materials. In the production of silicone elastomer tape coatings or silicone elastomer rubber compounds, where high tensile strength and high hardness values are not as important, lesser amounts of highly-reinforcing silica can be employed together with larger amounts of other types of fillers.

When the highly-reinforcing silica fillers employed in this invention are highly acidic in nature, as for example, having a pH of 4 or less, it is often times desirable to add thereto onto the silicone compounds, materials which tend to neutralize the effects caused thereby. In such instances, buffers such as the alkaline earth compounds, including calcium zirconate, barium zirconate and the like, can be added in appropriate amounts to the fillers or to the mixture of polydiorganosilixane gum, process aid and silica filler during compounding.

In addition to the above ingredients, there may also be added to the heat vulcanizable silicone rubber composition additives such as heat stabilizers, for instance, iron oxide and flame retardant additives, such as for instance, platinum and other types of compounds. In addition, other types of desirable ingredients which desirably affect the properties of the resulting cured heat vulcanizable silicone rubber composition may be added to the composition prior to its cure at elevated temperatures.

The foregoing examples are given for the purpose of illustrating the process of the present invention and not for the purpose of setting the limitations of the invention of the instant case. All parts unless specified otherwise are by weight.

Example 1

There is mixed in a reaction vessel 95 parts of dimethylcyclictetrasiloxane and 15 parts of diphenyltetracyclicpolysiloxane. To this mixture there is added 5 parts of a trimethyl end-stopped polydimethylsiloxane of a viscosity of 50,000,000 centipoise. There is also added to the above ingredients 500 parts per million of a chain-stopper hexamethyldisiloxane. The resulting ingredients are mixed and the reaction vessel is closed and heated at a temperature of 150° C. for a period of 2 hours, whereupon during that period there is continually drawn off a dimethyltetracyclicpolysiloxane-water azeotrope until the moisture content in the kettle is less than 50 parts per million. At this time there is added to the reaction ingredients 20 parts per million of KOH based on the reaction ingredients in the reaction vessel which material is anhydrous and which is added in an anhydrous manner. The resulting ingredients are then heated with constant agitation to a temperature of 160° C. for 6 hours. At the end of that time there was found to be 15% of volatiles in the reaction mixture. To the reaction mixture there was added 50 parts per million of acetic acid with constant agitation so as to neutralize all the KOH present in the reaction vessel. After the addition of acetic acid and agitation for ½ hour, the vessel was heated at a temperature of 170° C. for a period of 1 hour to drive off all the volatiles. The reaction product was dimethyldiphenyl linear polysiloxane polymer and had a phenyl content of 5.3 mole percent and a viscosity of 50,000,000 centipoise at 25° C. 100 parts of this polymer was taken and mixed with 40 parts of silica filler, 6 parts of a process aid of the formula.

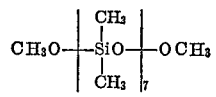

The resulting ingredients were mixed thoroughly for a period of 10 minutes and then placed on the mill where there was milled into the composition 2.0 parts of a curing catalyst which in this case was benzoyl peroxide. This curing catalyst was milled into the resulting ingredients wherein the parts of the curing catalyst used is based on the parts of the reaction product that was present in the mixture. The resulting sheet was pressed in a 6" x 6" x 70 mil mold at 150° C. for 15 minutes. The cured sheet was then placed in an air drying oven for 1 hour at a temperature of 150° C. The cured sheet was taken out and tested for its physical properties which were as follows:

Tensile strength (p.s.i.) _____ 1250
Elongation (percent) _____ 500
Hardness (Shore A) _____ 57

It should be noted that these properties of the cured silicone rubber composition are as good if not better than heat vulcanized silicone rubber compositions wherein the linear diorganopolysiloxane ingredient is made by some other process.

Example 2

To 95 parts of octamethylcyclotetrasiloxane there was added 5 parts of a trimethyl end-stopped polydimethylsiloxane of a viscosity of 60,000 centipoise, both of which ingredients were added to a reaction flask and stirred until the oil dissolved. Then, 42.9 parts of octaphenylcyclotetrasiloxane and 3 parts of vinylheptamethylcyclotetrasiloxane were next added to the flask along with 1000 parts of decamethyltetrasiloxane per million parts of octamethylcyclotetrasiloxane. The flask was heated to 150° C. and was purged with dry nitrogen until 2 parts of volatiles are removed and collected. Then, 0.0035 part of finely divided KOH was added and after 2 hours the viscosity of the flask contents began to increase. The flask was heated at 150° C. for 4 more hours, cooled to 80° C., and 0.1 gram of acetic acid was added to deactivate the KOH. Vacuum was applied to the flask at 10 mm. and the flask heated to 160° C. as volatiles were removed and collected. Vacuum stripping was discontinued when 10 parts of volatiles were collected. The viscosity of the polymer at 25° C. was $6 \times 10^7$ centipoise. Its composition was 14 mole percent diphenyl siloxy, 0.6 mole percent methylvinyl siloxy and the rest was dimethyl siloxy units.

Example 3

To 100 parts of octamethylcyclotetrasiloxane there was added 5.3 parts of a trimethyl end-stopped polydimethylsiloxane of a viscosity of 30,000 centipoise and placed in a resin flask along with 20 parts of symtetramethyltetravinylcyclotetrasiloxane and one part of hexamethyldisiloxane as a chain-stopper. The flask was heated to 150° C. and 2 parts of volatiles were removed by a dry nitrogen purge and collected. Then, 0.0025 part of finely divided KOH was added and within 2 hours the viscosity of the flask's contents began to increase. Heating was continued for 4 more hours at which time the volatiles content (1 hour at 2 mm. Hg at 100° C.) of the product was 11.4%. The batch was cooled to 80° C. and 0.0050 part of phosphoric acid was added and admixed. The viscosity of the product was 40,000 centipoise and its composition 14 mole percent methylvinyl with the rest being dimethylsiloxy units.

Example 4

To 100 parts of octamethylcyclotetrasiloxane and 15 parts of octaphenylcyclotetrasiloxane there is added 0.1 part of decamethyltetrasiloxane to a flask which is heated to 150° C. Then, 2 parts of volatiles were removed with a dry nitrogen purge. Then, 0.006 part of finely divided KOH was next added. After four hours the viscosity of the batch had not increased and an additional 0.0060 part of finely divided KOH was added. The viscosity of the batch had not noticeably increased during the next 3 hours. After 12 hours from the first KOH addition the viscosity began to increase. The volatiles content of the batch reached 12% 16 hours after the first KOH addition. The product had a viscosity of 50,000,000 centipoise at 25° C. and its composition was 5.3 mole percent diphenyl with the rest being dimethylsiloxy units. This example illustrates the difficulty of carrying out the reaction at low alkali metal hydroxide levels without the linear polysiloxane additive of the present case.

I claim:

1. A process for producing diorganopolysiloxane polymers having a viscosity of 1,000 to 200,000,000 centipoise at 25° C., an aromatic content of 1 to 50 mole percent comprising (a) mixing a first cyclic polysiloxane of the formula, $$(R_2SiO)_n$$

with a second cyclic polysiloxane of the formula, $$(R'_2SiO)_n$$

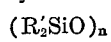

in the presence of 1 to 90 parts based on 100 parts of said first cyclic polysiloxane of a linear diorganopolysiloxane additive having a viscosity of 10,000 to 200,000,000 centipoise at 25° C., where the organo groups are selected from the class consisting of alkyl, cycloalkyl, mononuclear aryl, mononuclear alkaryl, mononuclear aralkyl, alkenyl, binuclear aryl, and mixtures thereof wherein up to 50 mole percent of the organo radicals may be aromatic and up to 50 mole percent of the organo radicals may be selected from alkenyl; (b) heating the mixture to temperatures in the range of 110–175° C. to drive off moisture; (c) adding up to 50 parts per million of an alkali metal hydroxide catalyst to the mixture, (d) equilibrating the resulting mixture at a temperature in the range of 140° to 200° C. until the reaction product is obtained, where R is selected from the class consisting of alkyl, cycloalkyl, alkenyl of 1 to 8 carbon atoms where there may be present no more than 15 mole percent alkenyl and R' is selected from the class consisting of mononuclear aryl, mononuclear alkaryl, mononuclear aralkyl and alkenyl of 2 to 15 carbon atoms and $n$ is a whole number that varies from 3 to 5.

2. The process of claim 1 wherein the alkali metal hydroxide of step (c) is selected from the class consisting of KOH, CeOH and RbOH.

3. The process of claim 1 wherein the equilibrating is carried out until there are present 10 to 25% by weight of cyclic polysiloxanes in the reaction mixture.

4. The process of claim 1 wherein the equilibrating step is carried out from 3 to 12 hours.

5. The process of claim 1 wherein in step (b) the mixture is heated until there is less than 50 parts per million of water in the mixture.

6. The process of claim 1 wherein after step (d) there is added to the reaction mixture a neutralizing agent and then the cyclic polysiloxanes are removed from the reaction product.

7. The process of claim 6 wherein the neutralizing agent is selected from the class consisting of toluene sulfonic acid, phosphoric acid, acetic acid and allyl bromide.

8. The process of claim 1 wherein there is added to the reaction mixture prior to step (c) a chain-stopper which has a viscosity of less than 10,000 centipoise at 25° C. and is selected from the class consisting of water, organodisiloxanes, organo end-stopped polysiloxanes, silanol-stopped disiloxanes and silanol-stopped polysiloxane.

9. The process of claim 8 wherein there is present in said reaction mixture from 100 parts per million to 30% by weight of the reaction ingredients of said chain-stopper.

10. The process of claim 1 wherein R is methyl and R' is selected from the class consisting of phenyl, vinyl and mixtures thereof.

11. The process of claim 1 wherein R is selected from the class consisting of methyl, vinyl and mixtures thereof and R' is selected from the class consisting of phenyl, vinyl and mixtures thereof.

12. The process of claim 1 wherein said linear diorganopolysiloxane has a viscosity of 20,000 to 50,000,000 centipoise at 25° C. and a concentration of trifunctional siloxy groups of no more than 500 ppm.

13. The process of claim 1 wherein said linear diorganopolysiloxane has basically the formula,

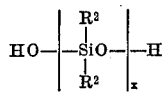

wherein $R^2$ is selected from the class consisting of alkyl, cycloalkyl, mononuclear aryl, mononuclear alkaryl, mononuclear aralkyl, alkenyl, binuclear aryl and mixtures thereof, wherein up to 50 mole percent of the $R^2$ radicals may be aromatic and up to 50 mole percent of the $R^2$ radicals may be selected from alkenyl, and $x$ varies from 500 to 15,000.

14. The process of claim 1 wherein the linear diorganopolysiloxane has the formula,

where $R^3$ is selected from the class consisting of alkyl, cycloalkyl, mononuclear aryl, mononuclear alkaryl, mononuclear aralkyl, alkenyl, binuclear aryl, and mixtures thereof, wherein up to 50 mole percent of the $R^3$ radicals may be aromatic and up to 50 mole percent of the $R^3$ radicals may be selected from alkenyl, and $a$ varies from 1.95 to 2.01.

References Cited
UNITED STATES PATENTS 3,340,288  9/1967  Sporck _____ 260—448.2
3,661,962  5/1972  Geipel _____ 260—448.2 E DONALD E. CZAJA, Primary Examiner M. I. MARQUIS, Assistant Examiner U.S. Cl. X.R.

260—37 SB, 46.5 G, 448.2 E, 825